United States Patent [19]

Hennen

[11] Patent Number: 5,068,952
[45] Date of Patent: Dec. 3, 1991

[54] APPARATUS FOR FITTING FLEXIBLE STRIPS

[75] Inventor: Heinz J. Hennen, Viersen, Fed. Rep. of Germany

[73] Assignee: Draftex Industries Limited, Edinburgh, Scotland

[21] Appl. No.: 621,606

[22] Filed: Dec. 3, 1990

[30] Foreign Application Priority Data

Dec. 7, 1989 [GB] United Kingdom ............... 8927677

[51] Int. Cl.$^5$ ............................................ B23P 21/00
[52] U.S. Cl. .................................................... 29/235
[58] Field of Search ............... 29/450, 451, 417, 235, 29/701; 198/428, 617; 414/744 A, 225, 786; 901/41, 36, 31, 37, 26; 269/329

[56] References Cited

U.S. PATENT DOCUMENTS 4,760,636 8/1988 Angelo et al. ....................... 29/451
4,863,150 9/1989 Nodl et al. ........................... 269/329

Primary Examiner—Robert C. Watson
Attorney, Agent, or Firm—Leydig, Voit & Mayer

[57] ABSTRACT

A tool for applying a channel-shaped sealing strip to a flange comprises two parallel rollers which are contra-rotated by a motor which engage opposite sides of the sealing strip to press it onto the flange, downward pressure onto the base of the sealing strip being maintained by a non-driven roller rotatable perpendicularly to the other two rollers. The latter roller is vertically supported on supports whose upper ends are slidable within chambers and sprung-loaded downwards. The tool must exert sufficient pressure downwardly onto the inverted base of the sealing strip via the perpendicularly arranged roller to push the supports of this roller upwardly such that a striker actuates a pneumatic or electrical switch. When this happens, the motor is energized and the other two rollers drive the tool along the flange, thus pushing the strip firmly onto the flange. The switch stops the motor automatically if insufficient downward pressure is applied.

17 Claims, 6 Drawing Sheets

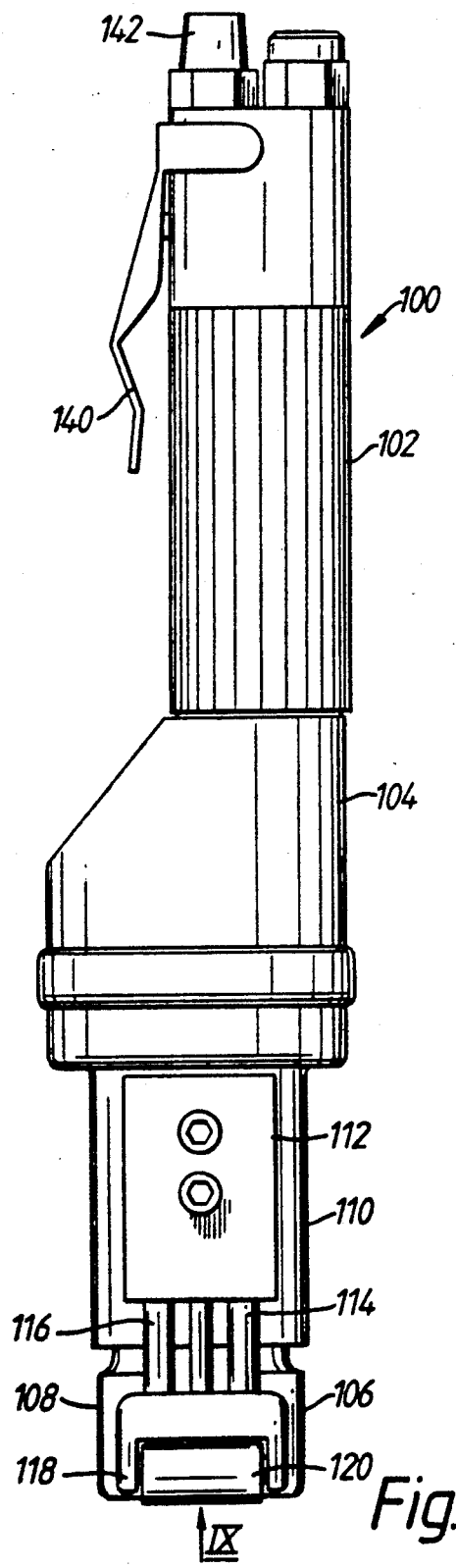
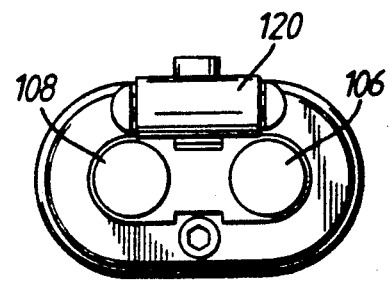
Fig. 9.
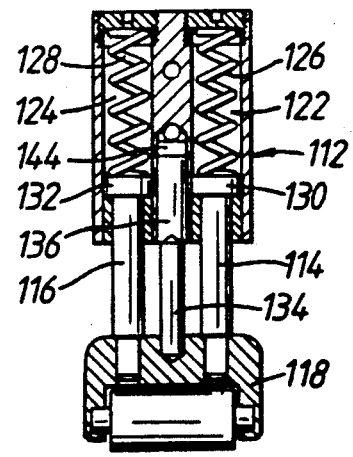
Fig. 10.
Fig. 8.

APPARATUS FOR FITTING FLEXIBLE STRIPS

The invention relates to apparatus for fitting flexible strips. For example, such strips may be sealing or trimming strips which are required to be fitted around a door or other closable opening on a motor vehicle body.

According to the invention, there is provided a tool for fitting a length of channel-shaped strip onto a mounting flange or the like, comprising a body portion carrying strip engaging means for engaging the outside surface of the strip when on the mounting flange and which includes roller means for contacting the said surface of the strip and applying pressure thereto, motor means carried by the body portion for rotating the roller means and frictionally driving the tool along the length of the strip on the flange, and pressure-responsive means responsive to the magnitude of the pressure applied to the surface of the strip by the roller means for producing a warning indication when the pressure falls below a predetermined level.

According to the invention, there is further provided a tool for fitting a length of channel-shaped strip onto a mounting flange or the like, comprising a body portion carrying first and second rollers which are rotatable about parallel spaced-apart axes and are connected to be driven in opposite directions by a motor incorporated in the body portion, a third roller mounted adjacent to the first two rollers for rotation about an axis perpendicular to their axes and supported from the body portion by resilient support means biassing the third roller away from the body portion, whereby in use the first and second rollers contact the respective sides of the strip corresponding to its channel-shape and apply it to the flange and the third roller applies pressure via its resilient support means to the outside of the base of the channel of the strip to push the strip onto the flange, and switch means responsive to movement of the third roller against the resilient bias of its support means for producing a warning indication when the pressure applied thereby to the outside of the base of the channel of the strip is less than a predetermined level.

Tools embodying the invention for fitting a sealing strip to the door surround of a motor vehicle body will now be described, by way of example only, with reference to the accompanying diagrammatic drawings in which.

Figure 4:
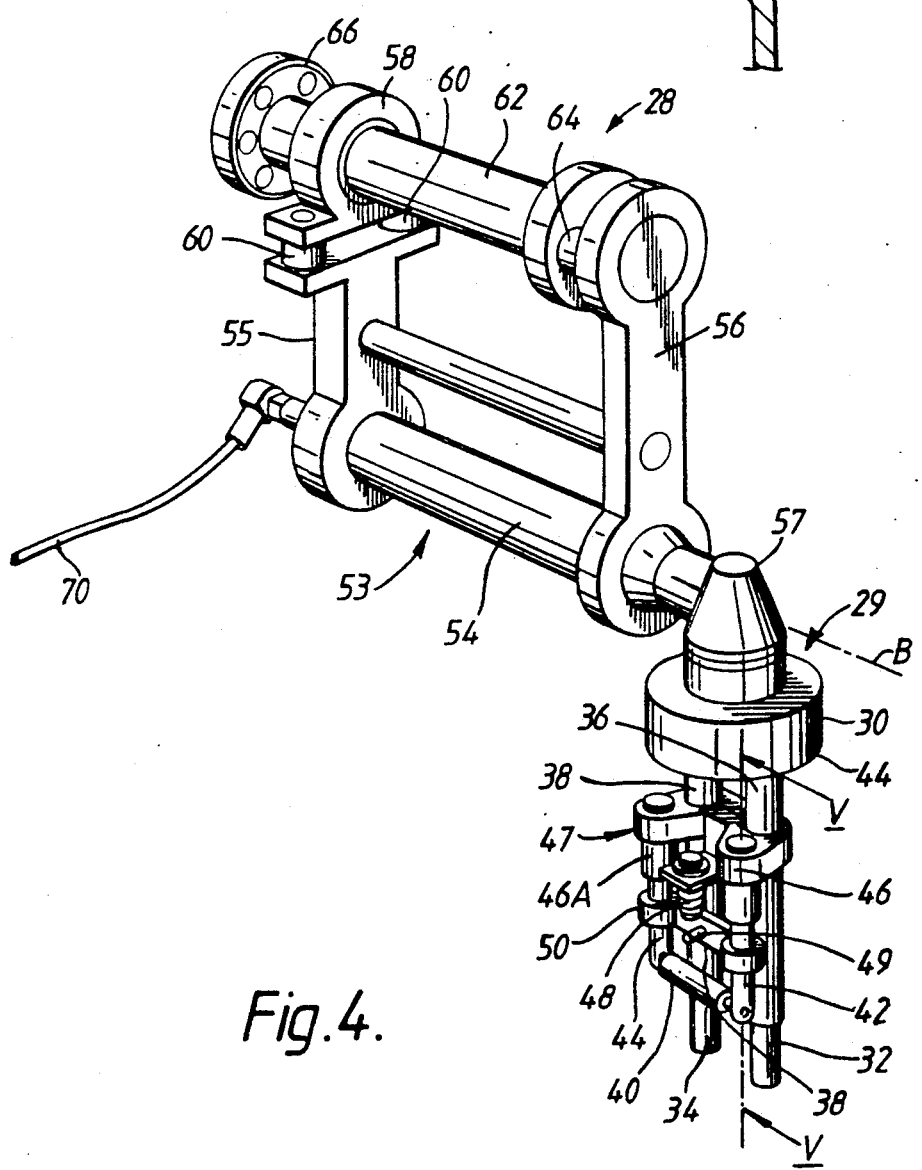
FIG. 4 is a perspective view of one of the tools.
Figure 7:
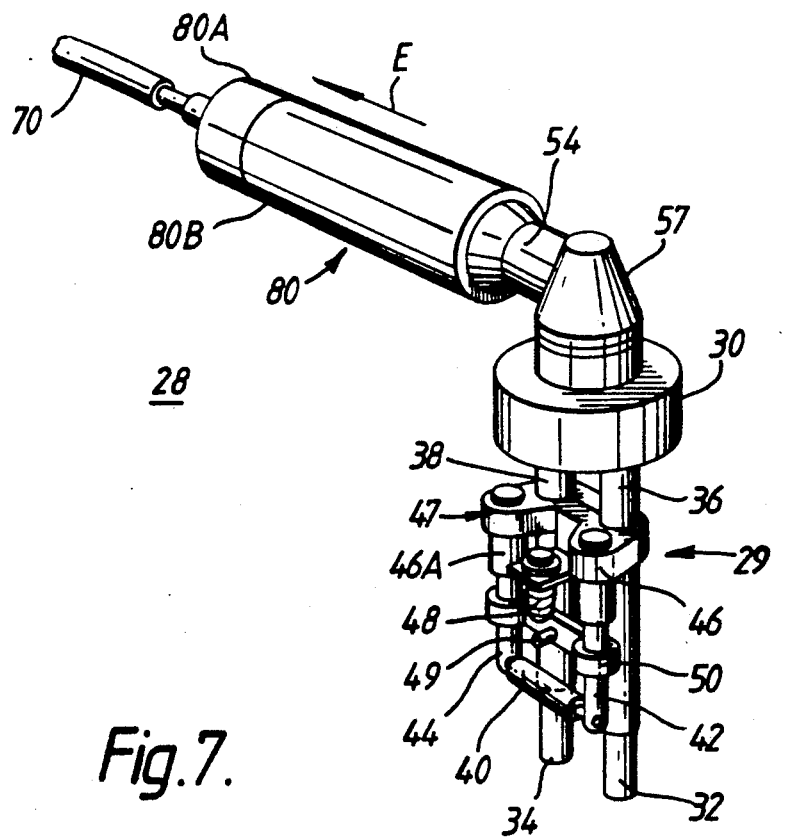
Figure 6:
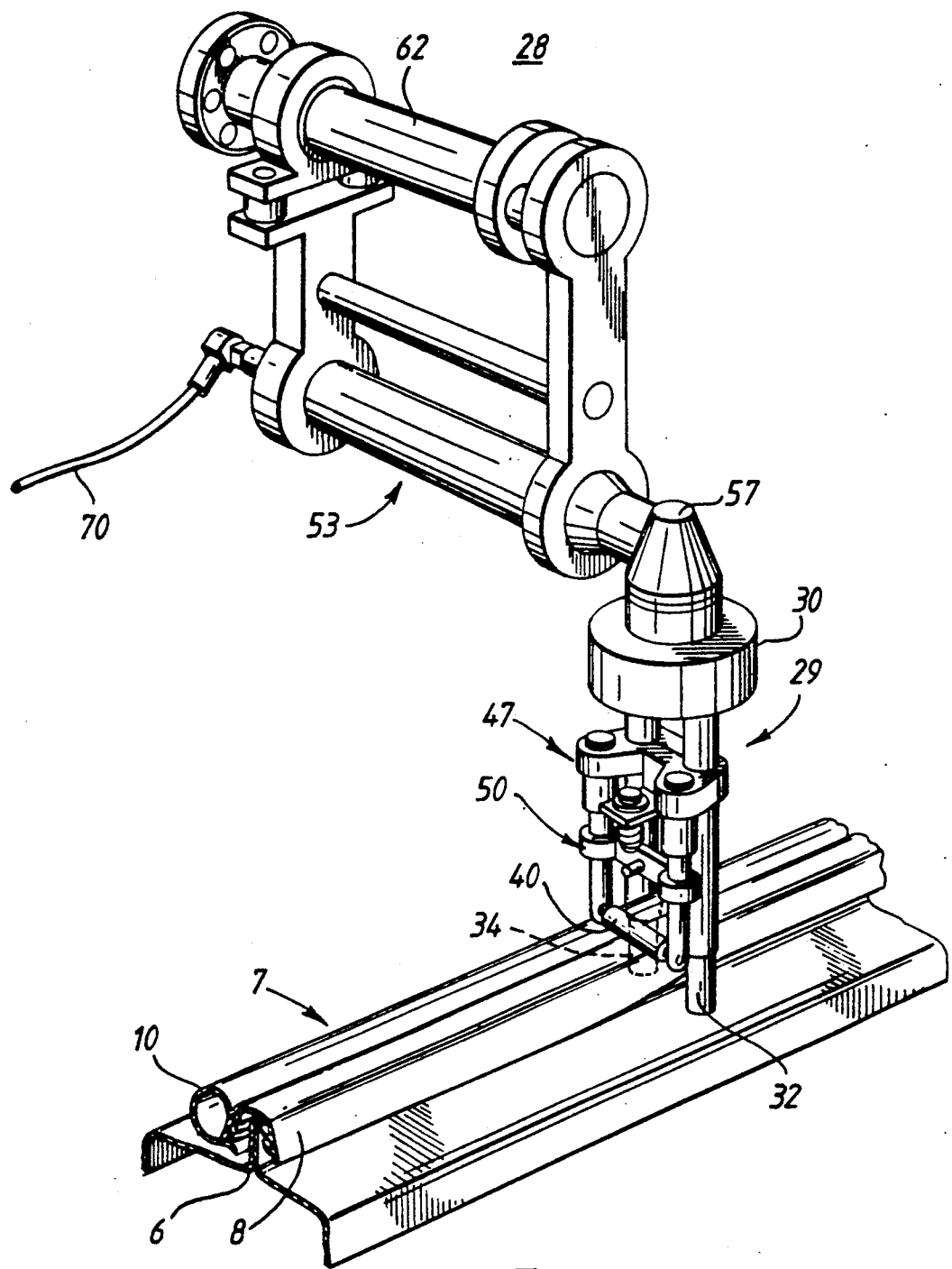

FIG. 6 corresponds to FIG. 4 but shows the tool in engagement with a seal on the door surround;

FIG. 7 is a perspective view corresponding to FIG. 4 but showing another of the tools;

FIG. 8 is a side elevation of a further one of the tools;

FIG. 9 is an underside view looking in the direction of the arrow IX of FIG. 8;

FIG. 10 is a cross-section through part of the tool of FIG. 8; and

Figure 11:
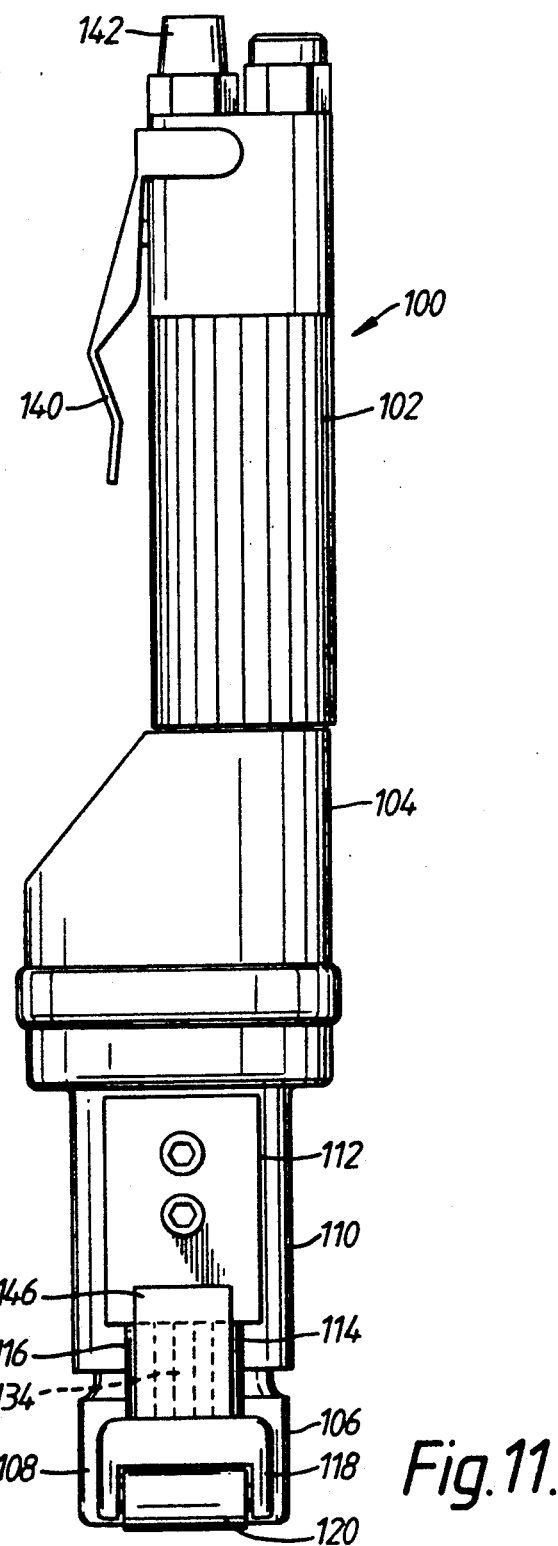

FIG. 11 shows a modification to the tool of FIG. 8.

Figure 1:
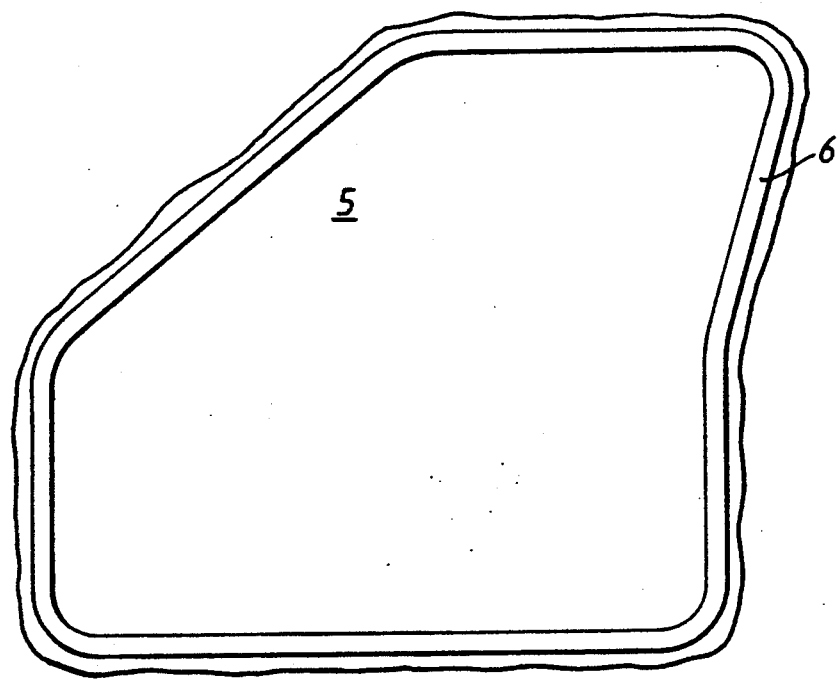
FIG. 1 is a side view of the door surround.
Figure 2:
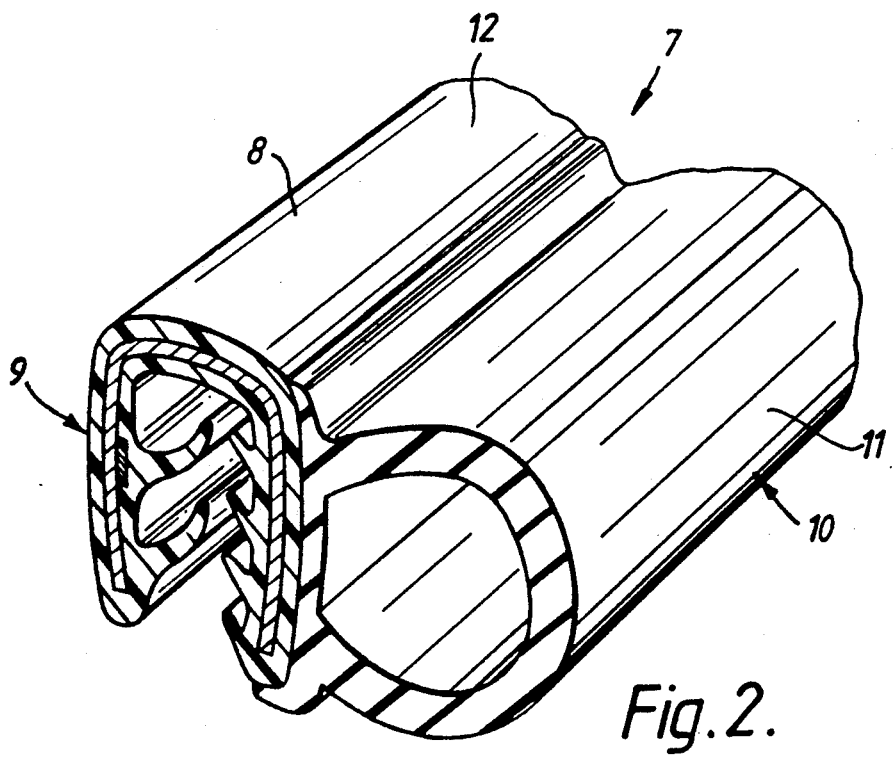
FIG. 2 is a perspective sectional view of the sealing strip.
Figure 3:
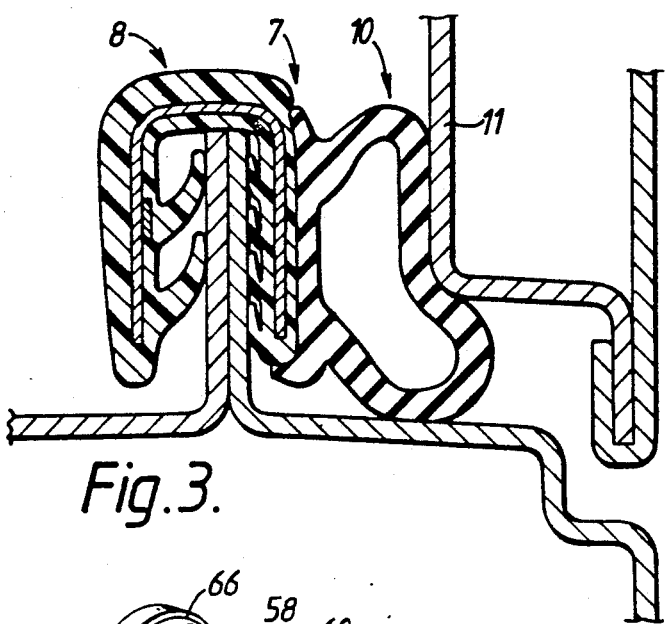
FIG. 3 is a cross-sectional view of the sealing strip in position on the door surround.

FIG. 1 shows a door opening 5 of a motor vehicle body. The door opening is defined by a flange 6 which is formed where the inner and outer skins of the body are welded together. In order to provide a seal for the door opening 5, the manufacture of the vehicle body involves the fitting of a door seal (see FIG. 2) onto the flange 6. As shown in FIG. 2, the door seal 7 comprises a channel-shaped gripping section 8 which, in use, embracingly grips the flange 6 and supports a soft tubular sealing section 10, so that the seal runs around the door opening with the sealing section 10 on the outside of the opening. As shown in FIG. 3, when the door (part of which is shown diagrammatically at 11) closes onto the opening, it partially compresses the tubular sealing section 10 so as to form a weather-proof seal. The tools now to be described are concerned with the automatic or semi-automatic fitting of the door seal onto the flange 6.

The tool 28 of FIG. 4 has an operative part 29 including a gearbox housing 30 supplying drive to two contra-rotatable rollers 32 and 34. These rollers are rotatable about parallel axes and are rotatably supported on support members 36 and 38 which extend downwardly from the housing 30.

In addition, the housing 30 supports a third roller 40. This is not motor-driven but is freely rotatable about a horizontal axis supported by downwardly extending supports 42 and 44.

Figure 5:
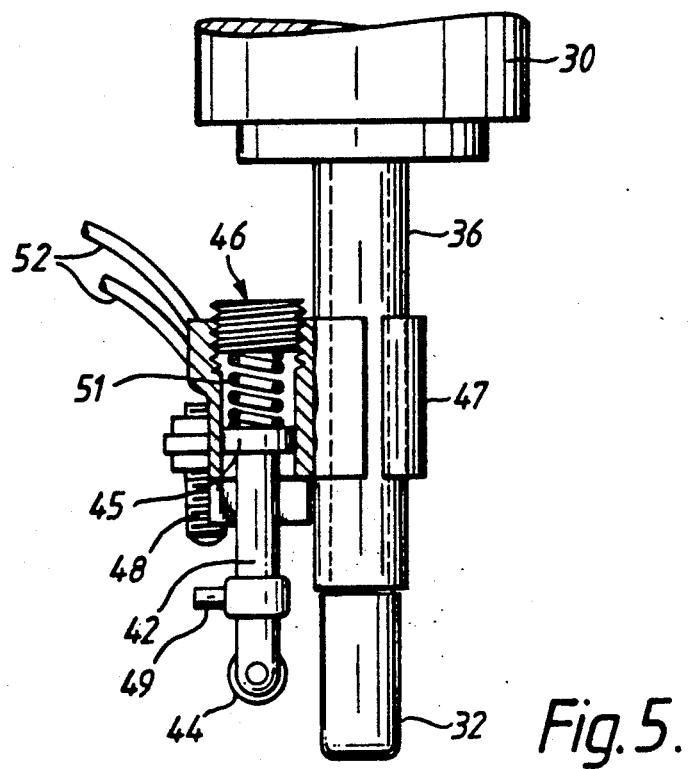
FIG. 5 is a part-section on the line V—V of FIG. 4.

Supports 42 and 44 carry pistons 45 (only one visible, see FIG. 5) which are respectively slidable in chambers 46,46A which are formed in a bracket 47, the latter being firmly clamped to the support members 36 and 38. Bracket 47 carries a pneumatic or electrical switch 48 which is positioned in alignment with a striker 49 carried by a member 50 which is rigid with supports 42 and 44. Pistons 45 are urged downwardly by springs 51 (only one visible, see FIG. 5) and urge roller 40 downwardly. When roller 40 moves upwardly (in a manner to be explained), striker 49 will eventually reach and operate switch 48 and this is signalled via pneumatic or electrical connections 52 (see FIG. 5).

The housing 30 is supported by a frame indicated generally at 53. This frame comprises a housing 54 containing a drive motor (electrical or pneumatic) which is connected to drive the two rollers 32 and 34 via an internal shaft, a coupling 57 and the gearbox in the housing 30. The housing 54 is rotatable within frame members 55 and 56 and extends through the latter where it is connected to the housing 30 by means of the coupling 57. The ability of the shaft 48 to rotate within frame members 55 and 56 enables the operative part 29 of the tool to rotate relative to the frame 53 about axis B.

Frame member 55 is connected to a coupling 58 by means of stiff rubber blocks 60 for a purpose to be described. Coupling 58 is clamped to a rod member 62 which is in turn connected to the upper end of frame member 56 by further stiff rubber blocks 64 (only one visible in the Figure). At its opposite end, the rod member 62 carries a connection 66 by means of which it may be linked to the operating arm of a robot.

Electrical or pneumatic power is supplied to the motor within the housing 54, by means of a connection shown at 70.

In use of the tool 28 shown in FIG. 4, a sealing strip of the general form shown in FIGS. 2 and 3 is placed on the mounting flange 6. The tool is then placed over the seal 7 on the flange 6 so that the roller 32 engages the outside wall 9 (FIG. 2) of the gripping section 8 and the roller 34 engages the outside surface 11 of the sealing section 10. The roller 40 engages the inverted base 12 of the gripping section 8. Such positioning of the tool on the sealing strip is shown in FIG. 6.

The tool is brought into the position shown in FIG. 6 automatically by a robot arm which is attached to the frame 53 at the coupling 66 (FIG. 4). The robot then energises the motor within the housing 54 so as to contra-rotate the rollers 32 and 34. The rollers thus drive the tool along the length of the sealing strip on the flange, the spacing between the rollers 32 and 34 being selected such as to press the sides of the gripping section 8 into firm contact with the sides of the flange. At the same time, the robot arm maintains pressure downwards so that the roller 40 presses the gripping section 8 downwards onto the flange.

As the rollers 32 and 34 rotate, the tool and the robot arm are carried along the length of the flange. As the tool reaches a bend in the flange 6, the action of the rollers 32,34 and 40 is such that the operative part 29 of the tool swivels relative to the frame 53. The attitude in space of the robot hand and the frame 53 does not immediately change. This enables the rollers 32,34 and 40 to follow the bend in the flange without any precise adjustments of the robot arm itself. Thereafter the robot moves the robot hand through an appropriate angle so as to bring the frame 53 and the operative part of the tool back into the relationship shown in FIG. 4.

In this way, programming of the robot is simplified. The tool itself guides the robot arm to follow the configuration of the flange.

In order to permit such local variations in the position or attitude of the flange to be accommodated without the need for continual pre-programmed adjustments by the robot, the rubber joints 60 and 64 permit a certain amount of flexure within the mounting frame 53, thus permitting the operative part 29 of the tool to alter its attitude relative to the frame 53 (in addition to its rotation about the axis B).

It is important that the tool applies sufficient and continuous pressure onto the base 12 of the gripping section 8 via the roller 40—in order to ensure that the seal is pressed properly onto the flange. Such pressure has to be maintained by the robot acting via the robot arm. Switch 48 senses whether sufficient pressure is being applied to the base 12 of the gripping section. If insufficient pressure is being applied, striker 49 does not operate switch 48 and this is signalled by the switch to the robot via connections 52 and the robot increases the pressure accordingly. For ease of illustration, FIG. 6 shows the striker 49 clear of the switch 48.

FIG. 7 shows a modified form of the tool. In FIG. 7, items corresponding to those in FIG. 4 are correspondingly referenced. The tool 78 of FIG. 7 differs from the tool 28 of FIG. 4 in that the tool 78 is intended for manual rather than robot operation. As shown, the operative part 29 of the tool 78 is virtually identical with that shown in FIG. 4. However, there is no frame 53. The housing 54 is instead held within a hand grip 80 which is rotatable relative to the housing 54 and is intended to be grasped by both hands of the operator. As before, connection 70 carries the power for the motor within the housing 54.

In use, the operator picks up the tool 78 by gripping the hand grip 80 and applies the tool to the sealing strip already on the flange 6, the rollers 32,34 and 40 engaging the sealing strip in the same manner as described above with reference to FIGS. 4 and 5. The operator energises the motor within the housing 54. This is done by means of a switch incorporated within the hand grip 80. As shown in FIG. 7, one part 80A of the hand grip 80 can be moved axially relative to the remaining part 80B in the direction of an arrow E against a spring. This axial movement activates a switch (not visible) incorporated within the hand grip 80 and energises the motor. The rollers 32 and 34 commence to rotate and the tool 78 moves along the length of the flange. The rollers 32 and 34 press the sides of the gripping section 8 into tight gripping engagement with the flange. At the same time, the operator maintains sufficient pressure on the roller 40, via the hand grip 80, so as to press the gripping section 8 firmly onto the flange via the base 12.

When the tool reaches a bend in the flange, the operator does not alter the attitude in space in which he holds the hand grip 80. Instead, the tool 78 rotates relative to the hand grip 80 as the driven rollers 32 and 34 follow the curve in the flange. The tool continues to be driven along the flange and follows succeeding bends or curves in the same manner. The operator does not have to adjust the position of his hands to accommodate the bends or curves in the flange, such adjustment being automatically performed as a result of the ability of the operative part 29 of the tool to swivel relative to the hand grip 80.

If at any time the operator removes one of his hands from the hand grip 80, the two parts 80A and 80B will move back towards each other, in an axial direction, under the action of the spring referred to above, and the switch activating the motor will open, thus de-energising the motor immediately.

As with the tool of FIG. 4, the tool of FIG. 7 incorporates the pressure-sensitive switch 48 within the support arrangement for the roller 40. If this switch detects that the pressure being applied to the base 12 of the seal 7 by the operator via roller 40 is insufficient, the switch 48 automatically de-energises the tool motor (that is, it over-rides the switch within the hand grip 80). The operator is therefore made aware that he must increase the pressure until the motor is re-energised.

FIG. 8 shows another one of the tools. The tool of FIG. 8 comprises a body 100 containing a pneumatic motor in a body part 102. Through a gear box incorporated in a body part 104, the motor is connected to drive, in opposite rotary directions, rollers 106 and 108 corresponding to the rollers 32 and 34 of the other tools. Rollers 106 and 108 are supported on axles passing downwardly through a body part 110. The body part 110 supports a casing 112 in which are vertically slidable two supports 114 and 116 respectively corresponding to the supports 42 and 44 of the other tools. Supports 114 and 116 carry a block 118 in which is freely rotatably mounted a roller 120 corresponding to the roller 40 of the other tools.

FIG. 10 is a cross-section through the casing 112 and the block 118 (though omitting the other parts of the tool). FIG. 10 shows how the supports 114 and 116 are located within the casing 112, passing through bores leading into cylindrical spacings 122 and 124 in which respective compression springs 126 and 128 are located. Each support 114,116 terminates in a respective enlarged head 130, 132 on which the springs 122 and 124 bear.

In addition, the block 118 is connected to a push rod 134 which is slidable within an enlarged bore 136.

The operation of the pneumatic motor within the body part 102 is controlled by a switch operated by an operator's handle 140 (FIG. 8) controlling the supply of air under pressure which is fed through an inlet 142.

However, the operation is similar to that of the other tools illustrated in that the motor will not run unless the pressure being applied to the base 12 of the seal 7 (FIG. 6) by the operator via roller 120 (corresponding to the roller 40 of the other tools) is sufficient. When the operator applies the tool to the seal, he must press the tool over the seal so as to force the seal onto the flange. This pressure causes the supports 114 and 116 to move against the compression springs 126 and 128 (see FIG. 10). The rod 134 thus moves upwardly within the cylindrical bore 136. When its end contacts a switch arrangement 144 (a pneumatic switch, for example, see FIG. 10), the motor is permitted to be energised via the handle 140, and the tool operates in the manner explained above. If the pressure applied by the operator should fall below the required level, switch 144 de-energises the motor again, overriding the switch operated by the handle 140. The operator is therefore made aware that he must increase the pressure until the motor is re-energised.

The supports 114 and 116, together with the rod 134, form a barrier which prevents the operator from inadvertently placing a finger between the rollers 106 and 108. FIG. 11 shows a modification in which this protection is enhanced by a safety plate 146 which is connected to the block 118, and slides over the front of the casing 112 as the operator presses the tool onto the seal on the flange.

The tools shown may be used with particular advantage for mounting a sealing strip of the type shown in co-pending United Kingdom Patent Application No. 8727690 (Publication No. 2212844) though may be used for other types of seal as well. Advantageously, the spacing between rollers 32 and 34 (or rollers 106 and 108 in FIGS. 8 and 11) is adjustable, either manually by the operator when placing the tool over the sealing strip or automatically by means of the robot. It may, for example, be adjustable by changing the rollers for rollers of different diameter.

What is claimed is:

1. A tool for fitting a length of channel-shaped strip onto a mounting flange or the like, comprising
   a body portion carrying strip engaging means for engaging the outside surface of the strip when on the mounting flange and which includes roller means for contacting the said surface of the strip and applying pressure thereto,
   motor means carried by the body portion for rotating the roller means and frictionally driving the tool along the length of the strip on the flange,
   pressure-responsive means responsive to the magnitude of the pressure applied to the surface of the strip by the roller means for producing a warning indication when the pressure falls below a predetermined level, and
   a safety barrier positioned to block access to the rotating roller means.

2. A tool according to claim 1, including means responsive to the warning indication for de-energising the said motor means.

3. A tool according to claim 1, including means responsive to the warning indication for increasing the said pressure.

4. A tool according to claim 1, in which the roller means comprises at least one roller connected to be driven by the motor means and at least one other roller for applying the said pressure.

5. A tool according to claim 1, in which the roller means comprises
   first and second rollers mounted for rotation about parallel spaced-apart axes and connected to be driven by the motor means and positioned for engaging opposite sides of the strip corresponding to the sides of the channel thereof, and
   a third roller which is mounted for rotation about an axis transverse to the parallel axes and for applying the said pressure to the outside of the base of the channel of the strip.

6. A tool according to claim 5, in which the safety barrier is positioned to block access between the first and second rollers.

7. A tool according to claim 4, in which the said other roller is mounted for bodily movement towards and away from the body portion in a direction perpendicular to its axis of rotation and including spring means for biassing this roller away from the body portion whereby to apply the said pressure to the strip.

8. A tool according to claim 5, in which the said third roller is mounted for bodily movement towards and away from the body portion in a direction perpendicular to its axis of rotation and including spring means for biassing this roller away from the body portion whereby to apply the said pressure to the strip.

9. A tool according to claim 8, in which the safety barrier is positioned to block access to the first and second rollers and mounted for movement with the third roller.

10. A tool according to claim 8, in which the pressure-responsive means comprises switch means responsive to movement of the said third roller against the bias of the spring means.

11. A tool according to claim 10, in which the switch means is a pneumatic switch.

12. A tool according to claim 10, in which the switch means is an electrical switch.

13. A tool for fitting a length of channel-shaped strip onto a mounting flange or the like, comprising
    a body portion carrying first and second rollers which are rotatable about parallel spaced-apart axes, incorporated in the body portion and connected to drive the rollers in opposite directions,
    a third roller mounted adjacent to the first two rollers for rotation about an axis perpendicular to their axes, resilient support means supporting the third roller from the body portion and biassing the third roller away from the body portion,
    such that in use the first and second rollers contact the respective sides of the strip corresponding to its channel-shape and apply it to the flange and the third roller applies pressure via its resilient support means to the outside of the base of the channel of the strip to push the strip onto the flange, and
    switch means responsive to movement of the third roller against the resilient bias of its support means for producing a warning indication when the pressure applied thereby to the outside of the base of the channel of the strip is less than a predetermined level.

14. A tool according to claim 13, including means responsive to the warning indication for de-energising the motor.

15. A tool according to claim 13, including means responsive to the warning indication for increasing the said pressure.

16. A tool according to claim 13, in which the switch means is a pneumatic switch.

17. A tool according to claim 13, in which the switch means is an electrical switch.

* * * * *